J. SEAMAN.
FARM AND SOD PULVERIZER.
APPLICATION FILED JUNE 17, 1919.

1,332,921.

Patented Mar. 9, 1920.

Witness

Inventor
J. Seaman
By C.A.Snow & Co.
Attorneys

UNITED STATES PATENT OFFICE.

JAMES SEAMAN, OF MARMARTH, NORTH DAKOTA, ASSIGNOR OF ONE-HALF TO ALONZO J. VROOMAN, OF MARMARTH, NORTH DAKOTA.

FARM AND SOD PULVERIZER.

1,332,921.  Specification of Letters Patent.  Patented Mar. 9, 1920.

Application filed June 17, 1919. Serial No. 304,777.

*To all whom it may concern:*

Be it known that I, JAMES SEAMAN, a citizen of the United States, residing at Marmarth, in the county of Slope and State of North Dakota, have invented a new and useful Farm and Sod Pulverizer, of which the following is a specification.

This invention relates to improvements in sod pulverizers, the object of the invention being to provide a device for cultivating or pulverizing prairie sod by means of which a seed bed of a substantial depth may be prepared with the grass and roots on top so as to form a mulsh to protect the crop from drought.

With the foregoing and other objects in view, which will appear as the description proceeds, the invention consists in the novel features of construction and combination of parts which will be more fully described hereinafter and particularly pointed out in the claims.

In the drawings accompanying and forming part of this specification,

The same characters of reference designate the same parts in the different figures of the drawings.

Figures 1, 2:
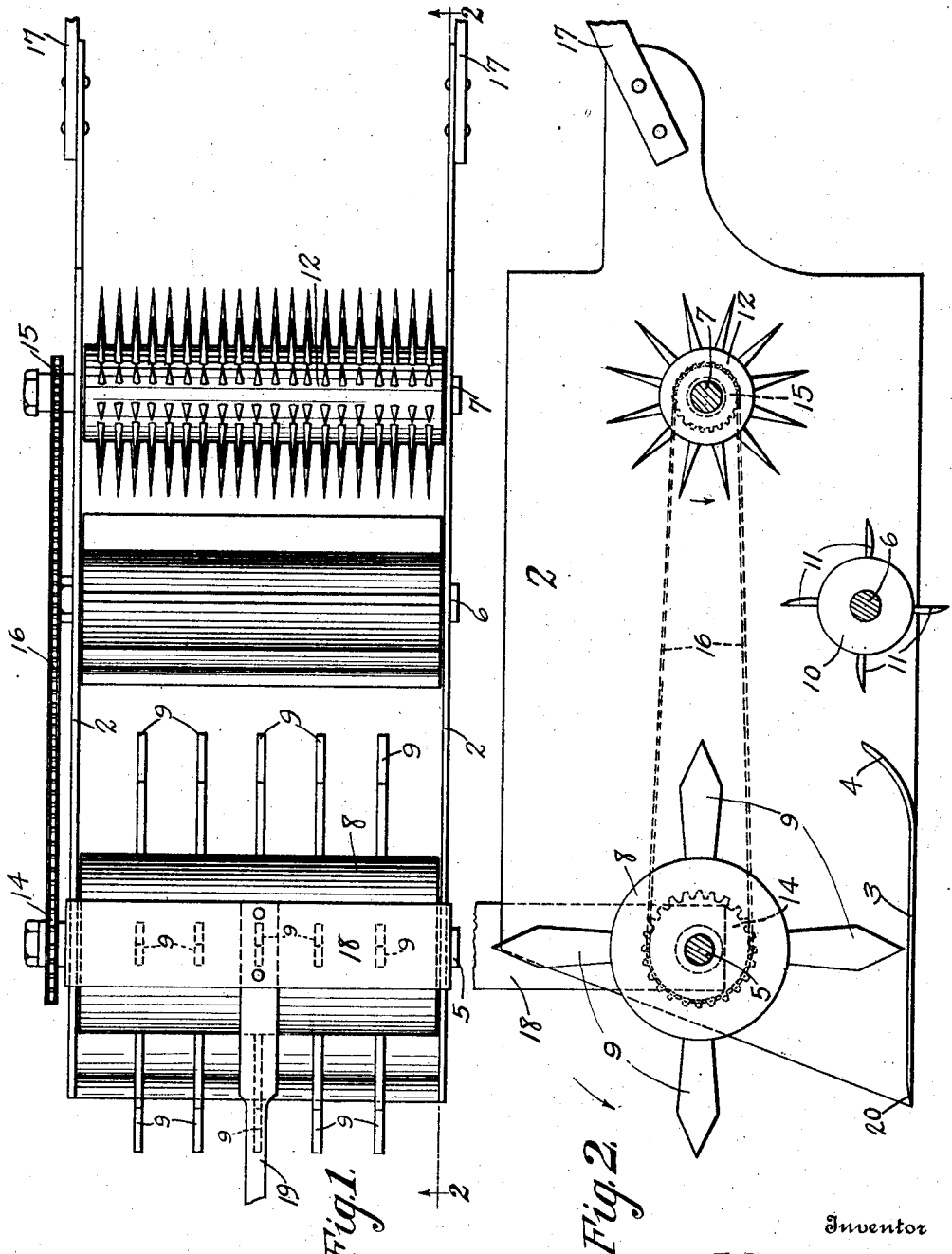
Figure 1 is a plain view of my improved pulverizer.
Fig. 2 is a sectional view taken on the line 2—2 of Fig. 1.

Referring to the drawings, 2 designates a pair of side members having secured thereto or formed integral therewith a bottom plate 3, the front edge of which is sharpened to a knife edge, while the rear edge thereof is turned upward, as shown at 4, to direct the sod upward toward the rear of the machine. Three shafts 5, 6 and 7 are mounted in suitable bearings in the side members 2, and on the shaft 5 is secured a cylinder 8 carrying a plurality of rows of pointed blades 9 extending radially therefrom around the circumference thereof, the rows being spaced at equal distances along the length of the cylinder so as to cut the sod into strips of equal width and the blades of one row being preferably staggered with relation to the blades of the adjacent row. On the shaft 6 is secured a cylinder 10 having attached thereto a plurality of knives 11 extending the full length of the cylinder, the knives being sufficiently wide to cut the sod from the underside after it has been cut into strips by the blades above described. On the shaft 7 is secured a third cylinder 12, having secured therein a plurality of pointed prongs 13, which are adapted to tear the sod apart and pull the roots out of the dirt.

The shafts 5 and 7 extend to the outside of one of the side members 2 and are provided with sprockets 14 and 15 respectively, over which runs a chain 16, the sprocket 14 being preferably larger than the sprocket 15, whereby the speed of rotation of the cylinder 12 is considerably faster than that of the cylinder 8. Suitable handles 17, (shown broken away), may be provided at the rear of the machine for guiding the same, while at the front thereof may be secured to the side bars 2 a bracket 18 carrying a draft pole 19, (also shown broken away), for permitting the machine to be pulled over the ground either manually or by attaching a horse thereto.

When the machine is pulled over the ground the nose 20 thereof is directed downward and the knife edge of the bottom plate 3 passes beneath the sod to any desired extent, the depth being controlled by means of the handles 17. As soon as the blades 9 come in contact with the sod the cylinder 8 is rotated in the direction of the arrow shown in Fig. 2, whereby the sod will be cut into strips of a width corresponding to the distance between the rows of blades, and as the machine moves forward these strips will be directed upward by the portion 4 of the bottom plate, whereupon the underside of the strips will be engaged by the knives 11 and the greater part of the soil cut therefrom, the top sod passing on toward the cylinder 12, the prongs of which will tear the sod apart and pull the roots out of the dirt, leaving the roots and grass on top of the ground. By this means a better crop can be produced on sod than on any other soil, since the seed can be planted with a press drill, with the old grass and roots on top to provide a mulsh, and after rolling the crop will be protected from drought and the seed covered at an equal depth, so that it will come up evenly and ripen at the same time.

While I have described in detail the structure herein illustrated, it is to be understood that I do not thereby limit my invention to the precise features of construction shown, as I am aware that many mechanical changes and modifications may be made therein without departing from the spirit and scope of the invention as set forth in the claims hereto appended.

Having thus described my invention, what I claim is:

1. In a device of the class described, a frame including side members and a fixed bottom cutter connecting the side members and coöperating therewith to form a length of sod of predetermined width; a first rotary element journaled between the side members; a second element mounted between the side members and located above the bottom cutter, the second element embodying means for subdividing the length of sod into strips as the length of sod traverses the bottom cutter, the rear end of the bottom cutter being upwardly inclined to deliver the strips of sod on top of the first rotary element, the first rotary element being provided with longitudinally continuous blades operating on the under surface of the strips of sod to rid them of dirt; and means for shredding the strips after they have passed the first rotary element.

2. A device of the class described, constructed as set forth in claim 1 and further characterized by the fact that the second element is supported for rotation and carries blades which effect the sub-division of the length of sod into strips.

3. A device of the class described, constructed as set forth in claim 1 and further characterized by the fact that the second element and the shredding means are rotary elements carrying projecting parts.

4. A device of the class described comprising a frame; a rotary strip cutter and a rotary shredder located at approximately the same height and journaled in the frame; a rotary bottom cleaner located between the cutter and the shredder and journaled in the frame at a lower point than the cutter and the shredder; and a fixed bottom cutter on the frame beneath the strip cutter and including an upturned rear end constituting means for directing the strips on top of the bottom cleaner.

In testimony that I claim the foregoing as my own, I have hereto affixed my signature in the presence of two witnesses.

JAMES SEAMAN.

Witnesses:
M. A. TRIPP,
P. H. BETHKE.